United States Patent [19]
Petit et al.

[11] 4,217,023
[45] Aug. 12, 1980

[54] DEVICE FOR CONNECTING RACKS TO DISTRIBUTION FRAMES IN TELECOMMUNICATIONS EXCHANGES

[75] Inventors: André Petit, Saulx les Chartreux; Daniel Jamet, Nozay, both of France

[73] Assignee: Compagnie Industrielle des Telecommunications Cit-Alcatel, Paris, France

[21] Appl. No.: 951,208

[22] Filed: Oct. 13, 1978

[30] Foreign Application Priority Data
Nov. 4, 1977 [FR] France .............................. 77 33247

[51] Int. Cl.² .......................................... H01R 13/62
[52] U.S. Cl. .................................... 339/121; 179/98; 339/18 R; 361/426
[58] Field of Search ................. 361/426, 428; 174/59, 174/60, 65R; 179/98; 339/119 R, 121, 18 BR

[56] References Cited
U.S. PATENT DOCUMENTS

| Re. 29,371 | 8/1977 | De Bortoli et al. .................. 174/60 |
| 3,904,936 | 9/1975 | Hamrick et al. ...................... 361/428 |

FOREIGN PATENT DOCUMENTS
1466868 12/1966 France .................................... 339/121

Primary Examiner—Paul A. Bell
Assistant Examiner—Eugene F. Desmond
Attorney, Agent, or Firm—Sughrue, Rothwell, Mion, Zinn and Macpeak

[57] ABSTRACT

The invention is characterized by connectors 17, 18, connected by a plug-ended cord 15, it being possible to prewire and wrap the assembly in the factory, to connect a distribution frame 11 to a connector 18.

The contacts in the connectors are disposed on juxtaposed terminal strips each of which includes two rows of contacts, this allowing semiautomatic connections.

7 Claims, 6 Drawing Figures

DEVICE FOR CONNECTING RACKS TO DISTRIBUTION FRAMES IN TELECOMMUNICATIONS EXCHANGES

FIELD OF THE INVENTION

The invention relates to a device for connecting racks to distribution frames in telecommunications exchanges.

BACKGROUND OF THE INVENTION

Modern telecommunications exchanges include racks equipped with connectors in which printed circuit boards are disposed, and distribution frames to which the various user lines are connected.

Distribution frames mainly include connections which are generally constituted by plates or terminal strips provided on two opposite surfaces with contact pins which are most frequently wire wrapping pins. The contacts correspond from one surface to the other; generally, the same pins pass through the terminal strip and project from both surfaces. The front surface, which is more easily accessible, has jumpers connected to it as lines are assigned. The rear surface is reserved for connections with the rack.

Up till now, connections between racks and distribution frames have been positioned and wrapped (or, if applicable, soldered) in situ, one point at a time, then checked. These operations are often carried out under difficult conditions because of the bulk of the exchanges; hence they are long and expensive.

The invention aims to simplify these operations considerably and consequently to reduce substantially the installation cost of telecommunications exchanges.

SUMMARY OF THE INVENTION

The invention provides a device for connecting racks to distribution frames in telecommunications exchanges. The device includes a cable with a connector at each end and is characterized in that each connector comprises at least one housing component in which at least one terminal strip is detachably accomodated, said terminal strip comprising contacts whose positions correspond on two surfaces and the contacts being disposed on each surface in two parallel rows.

In such an assembly, it is possible to prewire the terminal strips of the connectors automatically and the connection device, also referred to as a plug-ended cord, can be manufactured and checked in the factory before being installed.

The following description, given with reference to the accompanying drawings by way of a non-limiting example, will make it easier to understand how the invention can be produced.

DESCRIPTION OF THE PREFERRED EMBODIMENT

Figure 1:
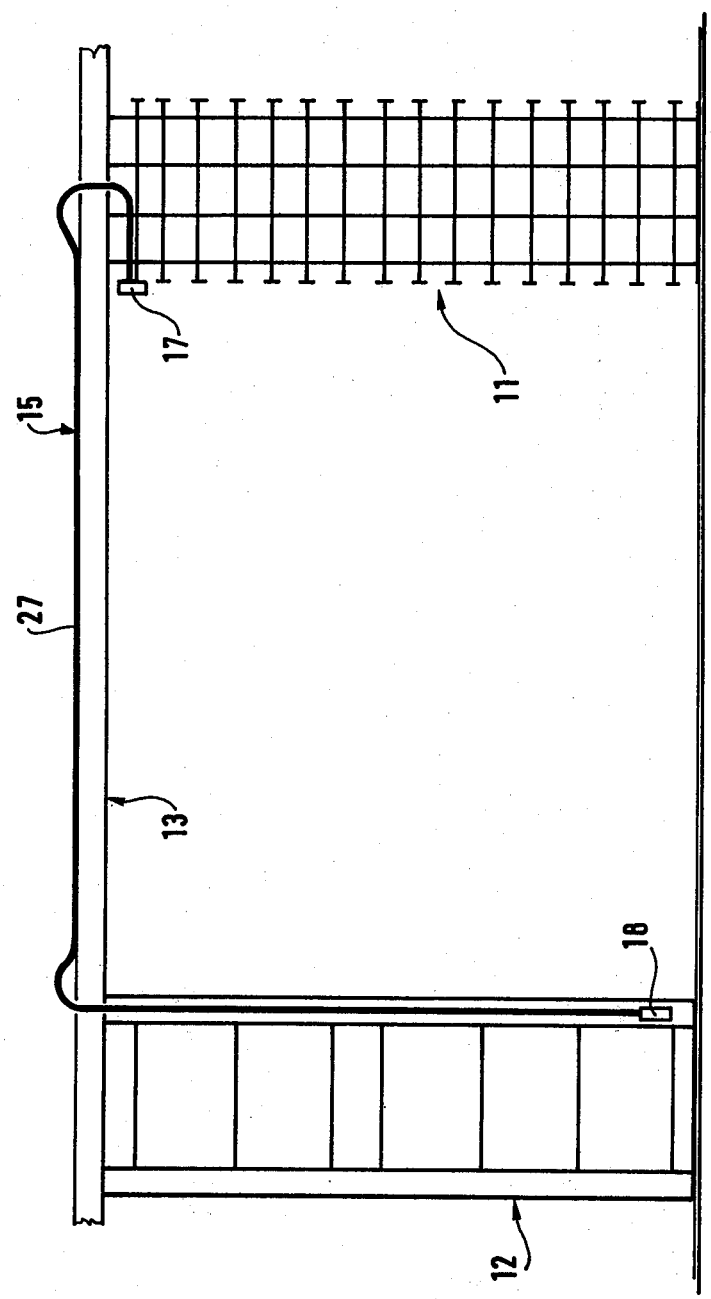
FIG. 1 is a general schematic view of several components of a telecommunications exchange with a connection device in accordance with the invention.

FIG. 1 shows schematically a distribution frame 11 and a rack 12 of a telecommunications exchange which are connected together by girders 13. The figure shows a plug-ended cord 15 constituted by a cable 27 and two connectors 17 and 18 each connected to one end of the cable. These connectors will be described in greater detail hereinafter. If the plug-ended cords 15 all have the same length, which is an advantage from the manufacture, storage and assembly point of view, the positions of the connectors 17 correspond to those of the connectors 18. Thus, in the figure, the connector 17 is placed at the top and the connector 18 is placed at the bottom.

Figure 2:
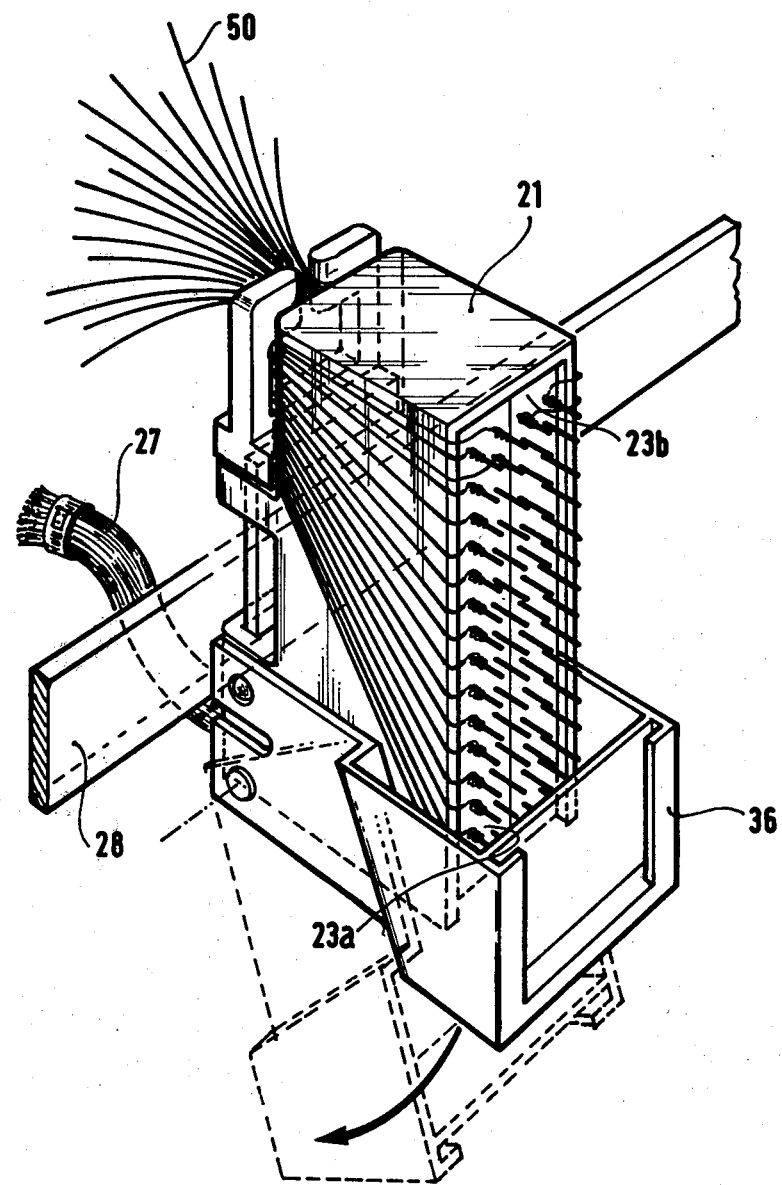
FIG. 2 is a perspective view of a particular embodiment of a completely connected connector with which the connection device in accordance with the invention is equipped.
Figure 3:
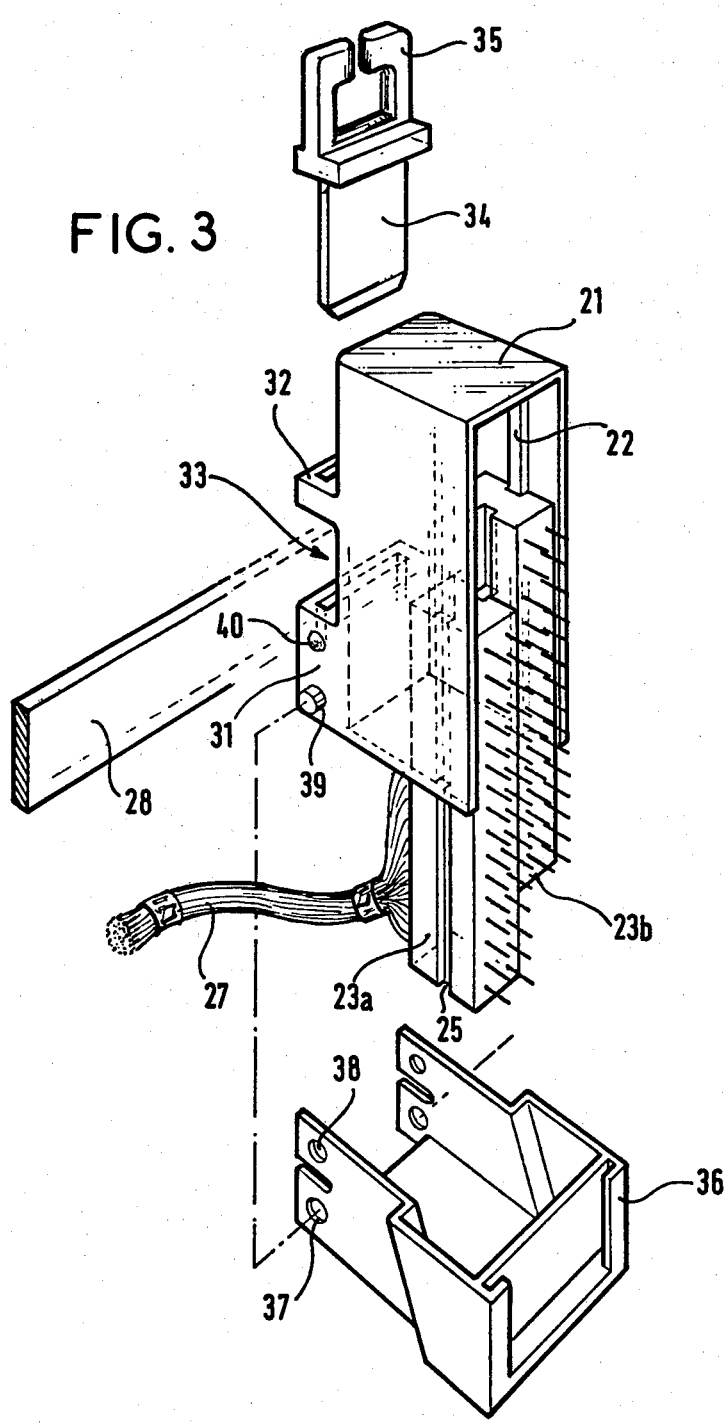
FIG. 3 is an exploded view of the connector of FIG. 2, before wire wrapping.
Figure 4:
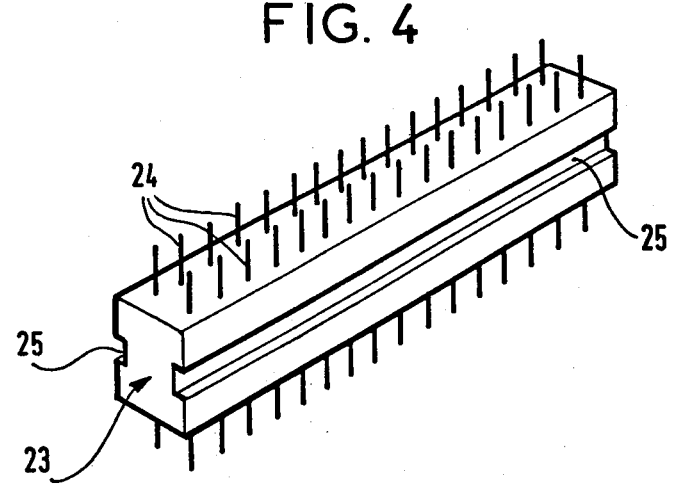
FIG. 4 is a perspective view of a contact-supporting terminal strip.

FIGS. 2 and 3 illustrate a particular embodiment of the connector 17 in connection with the distribution frame 11, FIG. 1. The connector illustrated comprises a housing 21 which has an inwardly projecting rib 22 on each of its side walls. Two identical terminal strips 23a, 23b for the connections are contained in the housing; one of these terminal strips is shown in greater detail in FIG. 4. Each terminal strip has pins 24 which project from two opposite surfaces and, on each surface which is to the side of its pins, each strip has a longitudinal groove 25 which corresponds to one of the ribs 22. Each terminal strip 23 has two rows of pins. Therefore the terminal strips can be wired to the machine with a tool which can wire two rows of pins simultaneously—one row on either side. In the disposition shown in the drawings, there can be one connector, for example a connector with four rows of pins spaced out on two terminal strips, which can be wired automatically. A plate, not shown, can also be inserted in the intermediate space delimited by the adjacent grooves 25 of two juxtaposed terminal strips. This is particularly useful if more than two terminal strips are to be provided. The terminal strips are prewired and placed in the housing 21. The housing is open on the front surface and on the lower surface via which surface the terminal strips are engaged. The cable 27 formed after the terminal strips have been wired leaves the housing via a cut out portion provided in the rear surface. The rear surface of the housing 21 advantageously includes means for fixing it on a cross or flat bar 28 of the distribution frame. These means comprise two brackets 31, 32 which leave a gap 33 between them, and a key 34 which bears at its upper part an open ring 35 for accomodating connection wires such as 50 while wiring progresses (FIG. 2). The connector is completed by a label support 36 which closes the housing at the lower end and protects the contacts. The label support has two holes 37, 38, on each side. These holes are in respective separate arms which can move apart. The housing has two stubs 39 and two protruding bosses 40. The stubs 39 are passed through the holes 37 by moving the arms of the label support quite far apart. The label support can then pivot about the stubs and be held in a stable position by resiliently inserting the bosses 40 in the holes 38. This pivoting action reveals the lower contacts of the terminal strips for wrapping.

Figure 5:
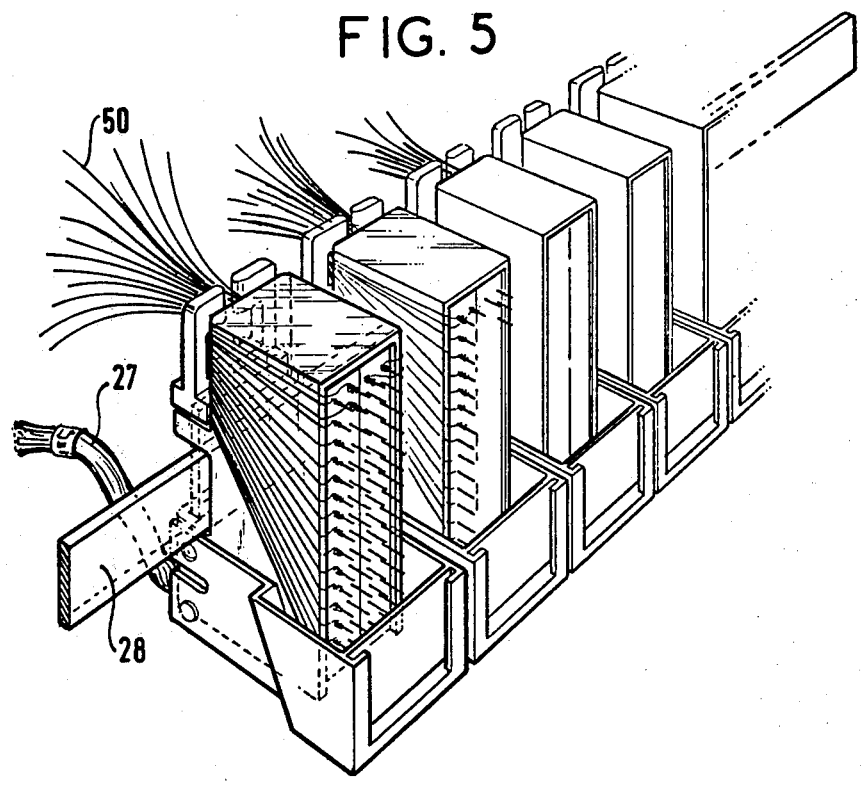
FIG. 5 is a general perspective view of connectors in accordance with FIG. 2 installed on a flat fixing bar.

FIG. 5 shows several connectors assembled side by side on a flat fixing bar of the distribution frame.

The connector 18 of FIG. 1, installed at the other end of the plug-ended cord can preferably be folded in half (like closing a book) to protect the connector during storage and delivery.

Figure 6:
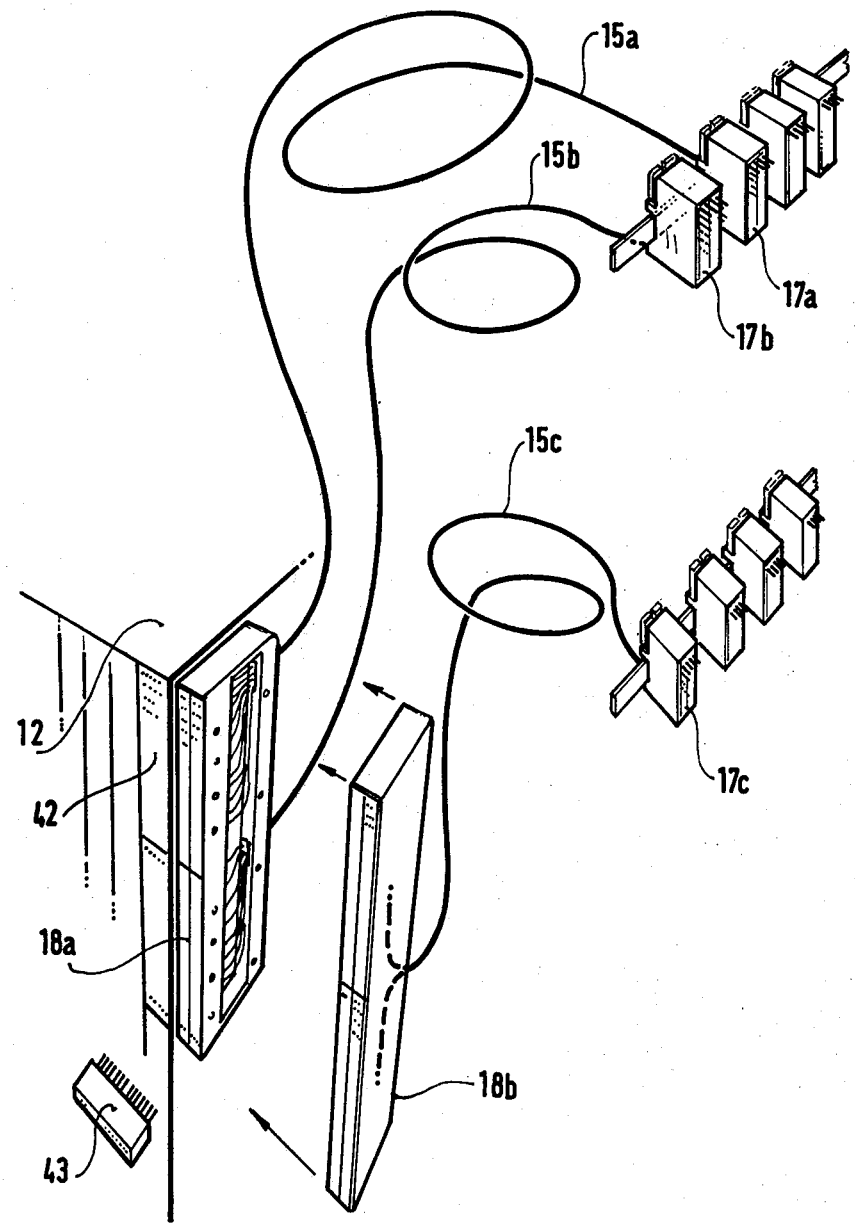
FIG. 6 is a diagram of the organization of the connections in a telecommunications exchange equipped with devices in accordance with the invention.

FIG. 6 shows two connectors 18a, 18b which are unfolded and installed on the rack 12 and plug-ended cords 15a, 15b, 15c which connect the connectors 18a, 18b to the connectors 17a, 17b, 17c. The connectors 18 are of the type which open into two half shells each fitted with a support rail prewired by rapid connection equipment. This arrangement enables the signalling functions of the wire 15c to be separated from the conversation functions of the wires 15a and 15b, for example, in accordance with the assignment, at the rack. The assembly makes it possible to prepare plug-ended cords in the factory specifically for one of these functions or the other.

In a known manner, the connectors 18 are placed adjacent the fixed connectors 42 of the racks and are connected thereto by plugs 43 which allow connection, cutting out or testing.

When the rear surface of the connectors has been prewired, once the connectors have been positioned, the connections can be wrapped (or soldered) on the front surfaces of the terminal strips as each connection is assigned.

The device in accordance with the invention provides for greater capacity with the same bulk as previously known devices. It meets installation requirements and more especially it can be prewired. Hence it has the following advantages:

saving of checking time;
saving of installation time; and
lower cost of general assembly.

We claim:

1. A device for connecting racks to distribution frames in telecommunications exchanges, said device including a cable having a connector at each end, the improvement wherein each connector comprises at least one housing component, at least one terminal strip detachably mounted within said at least one housing component, said terminal strip comprising contacts having corresponding positions on two opposed surfaces thereof, said contacts being disposed on each surface in two parallel rows, a flat elongated fixing bar for mounting of said housing component of at least one of said connectors, said housing component bearing two spaced brackets having a gap therebetween, said gap accommodating said flat fixing bar and said brackets bearing aligned elongated slots, and a key insertable through said bracket slots and gripping said flat fixing bar to lock said fixing bar within said gap.

2. A device according to claim 1, wherein several terminal strips are disposed side by side in said housing component.

3. A device for connecting racks to distribution frames in telecommunications exchanges, said device including a cable having a connector at each end, the improvement wherein each connector comprises at least one housing component, at least one terminal strip detachably mounted within said at least one housing component, said terminal strip comprising contacts having corresponding positions on two opposed surfaces thereof, said contacts being disposed on each surface in two parallel rows, each terminal strip being of rectangular cross-section and said contacts being constituted by rectilinear pins which project from parallel front and rear surfaces, and wherein for one of said connectors, said at least one terminal strip further comprises pinless side surfaces, said pinless side surfaces include slide grooves, and said housing further comprises inner surfaces carrying sliding ribs received by said grooves.

4. A device according to claim 3, wherein the housing component is completed by an articulated component for closing its open surfaces at least partially, said articulated component being articulated on the housing so that it can be removed, and means are provided to keep it in the operation position.

5. A device according to claim 3, wherein said housing includes at least one opening for access to said contacts, and further comprising fixing means on the side of said housing opposite said opening for fixing of said connectors to said distribution frame.

6. A device according to claim 5, wherein said distribution frame comprises a flat fixing bar, and said fixing means comprises two brackets borne by said housing component defining a gap receiving said flat fixing bar, and a key inserted through said brackets and locking said flat fixing bar to said housing component.

7. A device according to claim 6, wherein at its upper part opposite to the end which is inserted in the brackets, the key has an open ring for connection wires to pass through.

* * * * *